(12) United States Patent
Coyne et al.

(10) Patent No.: US 8,738,351 B2
(45) Date of Patent: May 27, 2014

(54) HISTORIC STORAGE OF DUAL LAYER POWER GRID CONNECTIVITY MODEL

(75) Inventors: Michael L. Coyne, Mount Colah (AU); Nis Jespersen, Frederiksberg (DK); Parul Sharma, Bangalore (IN); Suresh Srinivasan, Pune (IN); Lily S-Y Tse, Hurstville (AU)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/902,651

(22) Filed: Oct. 12, 2010

(65) Prior Publication Data

US 2012/0089384 A1   Apr. 12, 2012

(51) Int. Cl.
*G06F 17/50* (2006.01)
*G06G 7/54* (2006.01)

(52) U.S. Cl.
USPC .......................................................... 703/18

(58) Field of Classification Search
USPC .......................................................... 703/18
See application file for complete search history.

(56) References Cited

U.S. PATENT DOCUMENTS

| 7,111,018 B1 | 9/2006 | Goodrich et al. |
| 2009/0187579 A1 | 7/2009 | Brancaccio et al. |
| 2009/0281674 A1* | 11/2009 | Taft ............................... 700/286 |

* cited by examiner

*Primary Examiner* — Saif Alhija
(74) *Attorney, Agent, or Firm* — Law Offices of Ira D. Blecker, P.C.

(57) ABSTRACT

A power grid model system, method and computer program product which includes a switching state processor, a topological processor, an equipment update processor, and a historic power grid model for a power grid. The historic power grid model has an equipment layer and a topology layer. Responsive to a switch operated in a power grid, the switching state processor is notified of the operated switch, notifies the topological processor of the operated switch and notifies the power grid model for updating of the historic power grid model; and the topological processor determines the extent of the update of the power grid model, parses through details of the equipment layer and updates the topology layer in the power grid model. Responsive to an equipment update to the power grid, the equipment update processor is notified, updates the historic power grid model and notifies the topological processor of the equipment update; and the topological processor determines the extent of the update in the historic power grid model, parses through details of the equipment layer and updates the topology layer in the historic power grid model.

23 Claims, 5 Drawing Sheets

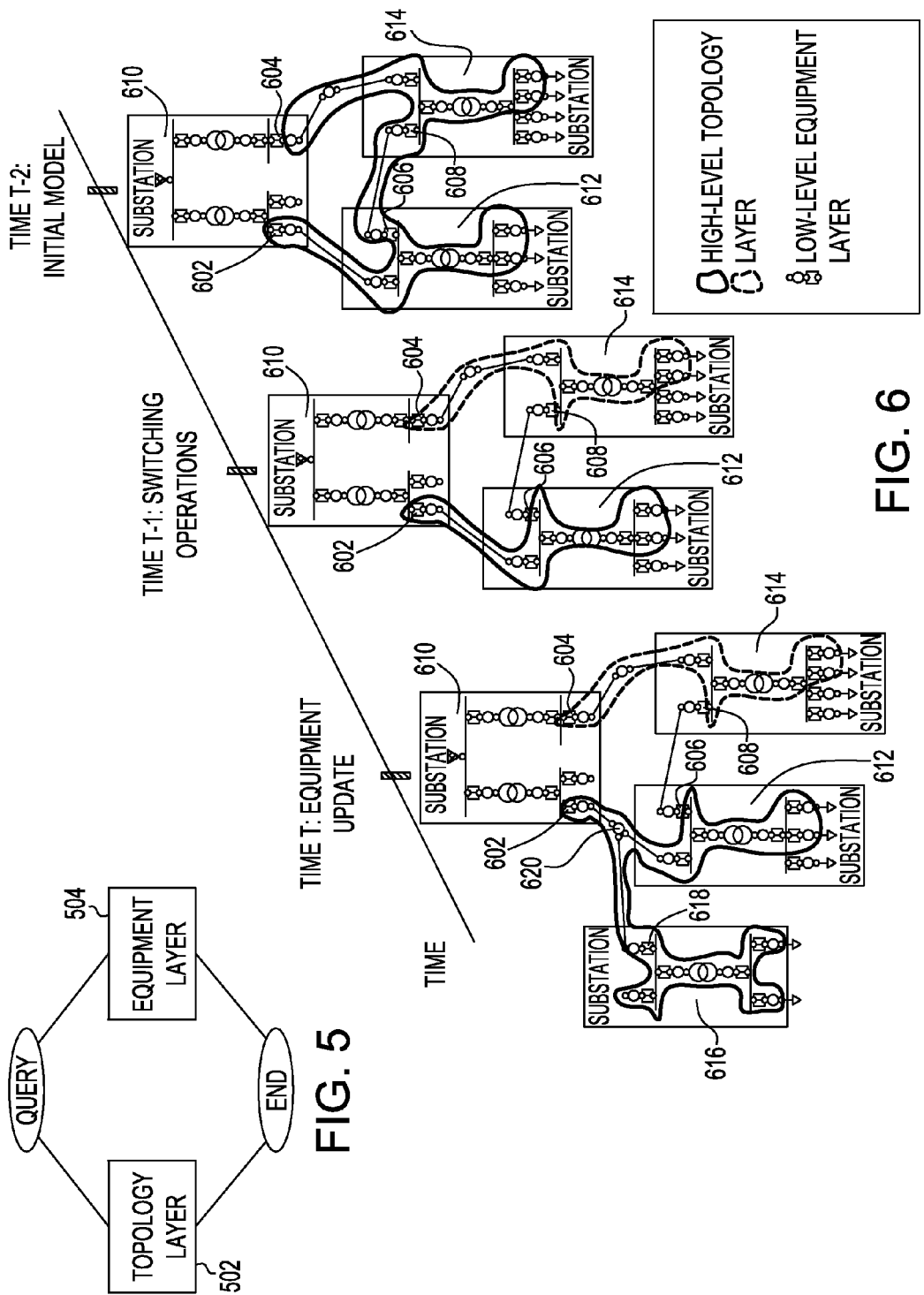

HISTORIC STORAGE OF DUAL LAYER POWER GRID CONNECTIVITY MODEL

BACKGROUND

The present invention relates to the power grid industry and, more particularly, relates to having storage of past connectivity and operational states of the power grid model.

Recent trends in the power industry, and in particular the emergence of smart grids, are driving new requirements in relation to the precision and availability of grid connectivity solutions.

Power grid models have traditionally been maintained by power utilities in their Distribution Management System (DMS) and Outage Management System (OMS). These power grid models keep the dynamic power grid connectivity state up-to-date for specific operational purposes.

Very detailed power grid models are typically stored in Geographical Information Systems (GIS) which capture the static connectivity model but not the frequently updated actual operational switch states. Further, information stored historically has been limited to flat time series data tables, providing at most the binary state of switches over time without the context of the power grid.

BRIEF SUMMARY

The various advantages and purposes of the exemplary embodiments as described above and hereafter are achieved by providing, according to a first aspect of the exemplary embodiments, a power grid model system. The power grid model system includes a switching state processor; a topological processor; an equipment update processor; and a power grid model for a power grid, the power grid model having an equipment layer and a topology layer; wherein responsive to a switch operated in a power grid, the switching state processor is notified of the operated switch, notifies the topological processor of the operated switch and notifies the power grid model for updating of the power grid model, and the topological processor determines the extent of the update of the power grid model, parses through details of the equipment layer and updates the topology layer in the power grid model; wherein responsive to an equipment update to the power grid, the equipment update processor is notified of the equipment updates, updates the power grid model and notifies the topological processor of the equipment update; and the topological processor determines the extent of the update in the power grid model, parses through details of the equipment layer and updates the topology layer in the power grid model.

According to a second aspect of the invention, there is provided a method of managing a power grid model system. The method of managing the power grid model system includes providing a switching state processor, a topological processor, an equipment update processor, and a power grid model for a power grid, the power grid model having an equipment layer and a topology layer; responsive to a switch operated in a power grid, notifying the switching state processor of the operated switch, notifying the topological processor of the operated switch, updating the operated switch in the power grid model, and determining by the topological processor the extent of the update of the power grid model, parsing by the topological processor through the details of the equipment layer and updating by the topological processor the topology layer in the power grid model; responsive to an equipment update to the power grid, notifying the equipment update processor, updating the power grid model and notifying the topological processor of the equipment update, and determining by the topological processor the extent of the update of the power grid model, parsing by the topological processor through the details of the equipment layer and updating by the topological processor the topology layer in the power grid model.

According to a third aspect of the invention, there is also provided power grid model management service method and according to a fourth aspect of the invention, there is provided a computer program product for managing a power grid model.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 5 is a flow chart of querying processes for an exemplary embodiment of a power grid model system.

FIG. 6 is an illustration of a hypothetical power grid as stored in an exemplary embodiment of the power grid model.

DETAILED DESCRIPTION

Existing power grid models do not provide the necessary historical storage of the power grid model for reaping the full benefits of smart grid implementations.

Figure 1:
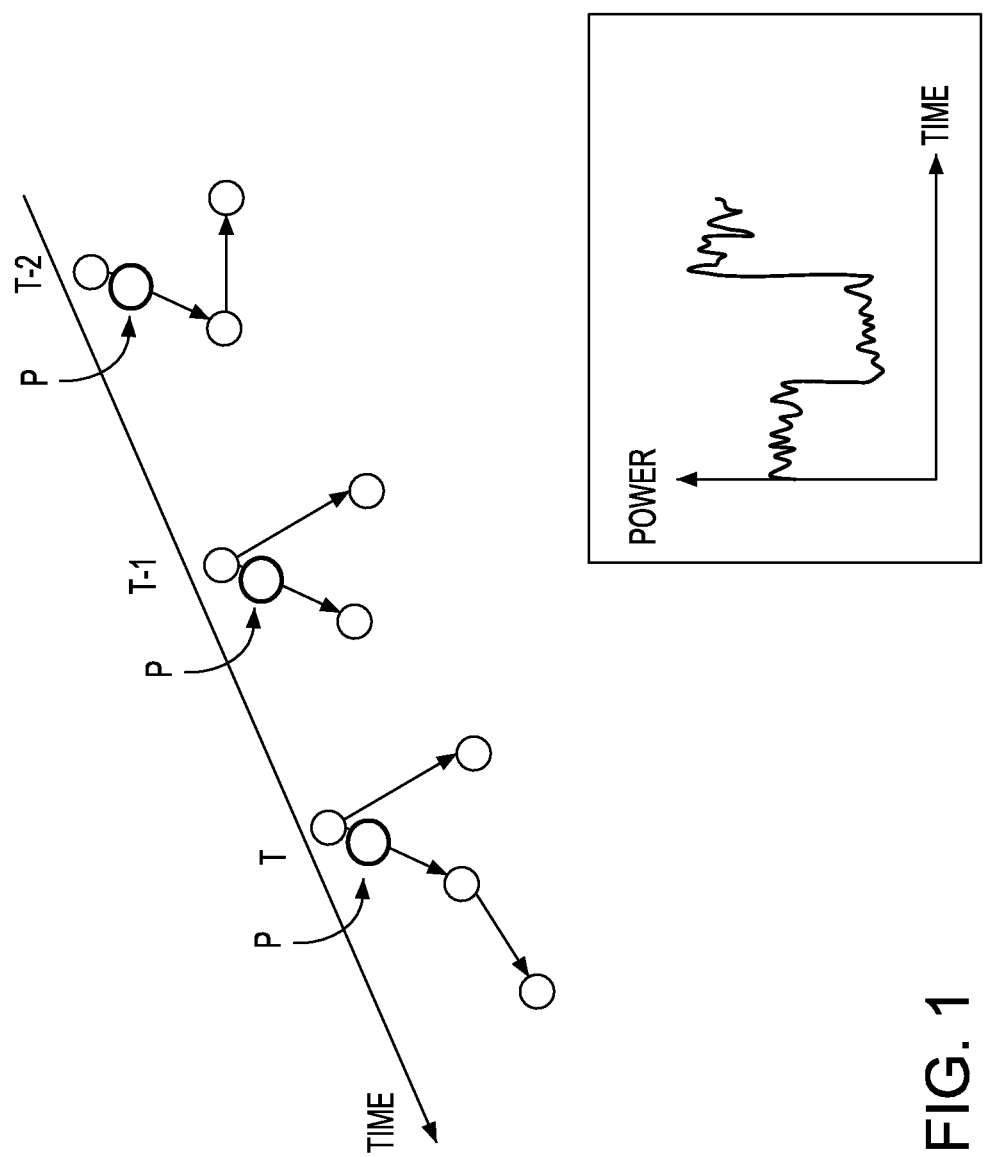
FIG. 1 is an illustration of a hypothetical power grid showing the power grid at three different points in time. The illustration also exemplifies a fluctuating power measurement at a point P of that power grid.

Referring to FIG. 1, there is shown an illustration of a hypothetical power grid. Analyzing load trends has previously been done based only on the current state of the grid at time T. Deviations in measured values, which in reality reflected the past different grid constellations in which the measurements were taken at times T-1 or T-2, goes unexplained. At best, stored historic switching operations may be applied onto the current power grid model at time T but this does not accommodate added or removed equipment is thus still imprecise as well as cumbersome. Such a power grid model greatly limits the value of smart grid solutions for fault investigations, grid planning, and other uses. As can be seen, measurements are taken in the hypothetical power grid at point P in each of the power grids at times T-2, T-1 and T. The measurements at point P are likely to change with each of the grids, as indicated in the chart of power versus time, due to the addition of equipment, changing of the configuration of the grid, different switch states, etc. The reason for the change in measurements may not be known without the context of the power grid at each of the times T-2, T-1 and T.

A power grid solution is required that enables power utilities a way to practically and precisely associate streams of measurements with the ever changing connectivity of the power grid over time. This solution would facilitate analysis of faults and network performance.

An exemplary embodiment is proposed in which historic maintenance and storage of a power grid connectivity model is kept at two levels. These levels are an equipment layer and a topology layer. The equipment layer includes a base equipment layer of the power grid overlaid with switch state data. The base equipment layer is the equipment of the power grid as designed or built. The switch state data is the power grid as operated which indicates whether the switches are open or closed. The topology layer is the logical connectivity of the power grid. The topology layer refers to how data is actually transferred in the power grid as opposed to its physical design. The topology layer is populated by a constantly running topological processing algorithm. Topological processing algorithms are conventional when applied to the current state of the power grid. The use of such topological processing algorithms is not conventional when applied to the historical storage of the power grid. Importantly, the exemplary embodiment historically captures and stores the static connectivity of the power grid (the as-installed state of the power grid) as well as the frequently updated actual switch states of the power grid (the as-operated state of the power grid).

Figure 2:
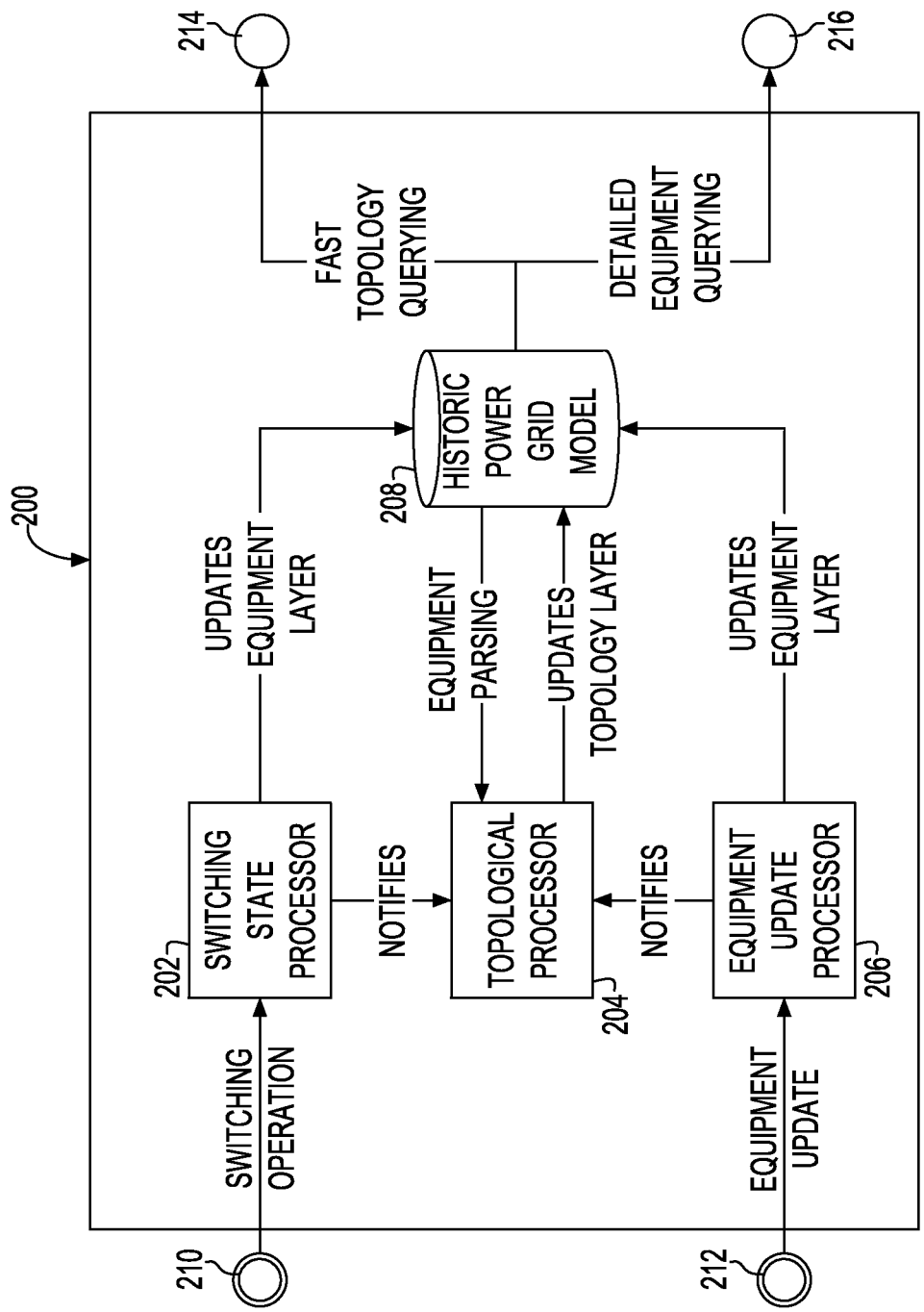
FIG. 2 is a graphical illustration of an exemplary embodiment of a power grid model system.

The exemplary embodiment of the power grid model system 200 is illustrated in FIG. 2. The power grid model system 200 includes four interacting components, namely, a switching state processor 202, a topological processor 204, an equipment update processor 206 and a historic power grid model 208. These four interacting components support three logical processes, namely, a switching state operation process, an equipment update process and a querying process.

Each of these four interacting components and three logical processes will be described in detail. The switching state processor 202 receives switching state information from a switch operated in the power grid, updates the equipment layer in the power grid model and notifies the topological processor of the switch update. The topological processor 204 determines the extent of the switch update and the minimum part of the power grid that needs to be re-traced. The topological processor 204 then updates the topology layer with the new switch information in the historic power grid model 208. The equipment update processor 206 receives equipment updates to the power grid and updates the equipment layer in the historic power grid model 208. The topological processor 204 determines the extent of the equipment update and the minimum part of the power grid that needs to be re-traced. The topological processor 204 then updates the topology layer with the new equipment information in the historic power grid model 208.

Information regarding the static and operational aspects of the equipment layer and topology layer are stored historically.

The interaction of the power grid model system 200 in FIG. 2 will be further described with reference to the switching state operation process, equipment update process and querying process in FIGS. 3 to 5, respectively.

Figures 3, 4:
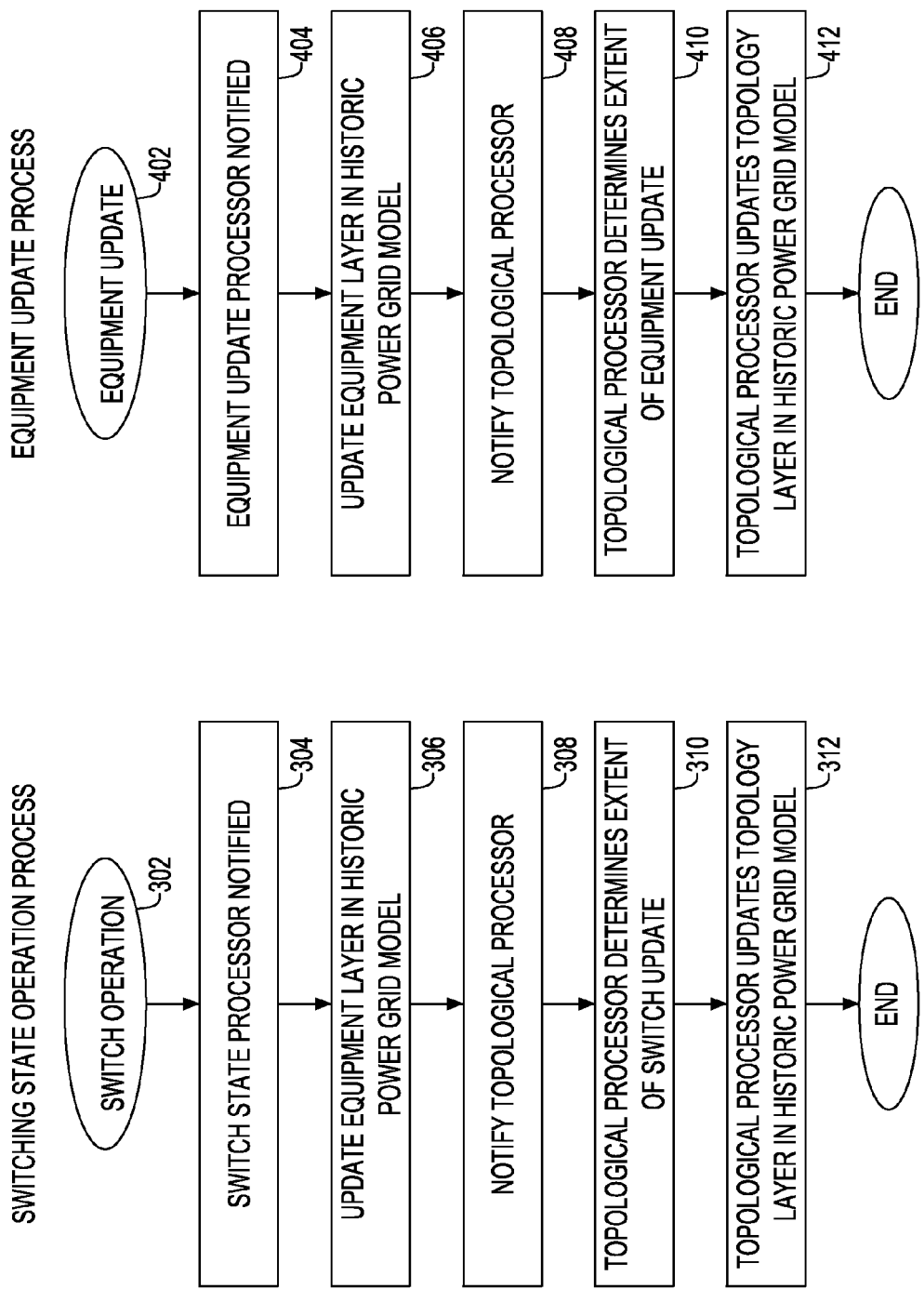
FIG. 3 is a flow chart of a switching state operation process for an exemplary embodiment of a power grid model system.
FIG. 4 is a flow chart of an equipment update process for an exemplary embodiment of a power grid model system.

First, the operation of the power grid model system 200 with respect to the switching state operation process in FIG. 3 is described. A switch 210 is operated in the power grid (302 in FIG. 3). The switching operation of the switch 210 may be the opening or closing of a switch. The switching state processor 202 is notified (304 in FIG. 3) which then updates the equipment layer in the power grid model (306 in FIG. 3). The switching state processor 202 further notifies the topological processor 204 (308 in FIG. 3). The topological processor 204 determines the extent of the switch update and the minimum part of the power grid that needs to be re-traced (310 in FIG. 3). For each starting point in the power grid, the topological processor parses through the details of the equipment layer in the historic power grid model 208. Upon completion of the trace, the topological processor 204 updates the topology layer in the historic power grid model 208 (312 in FIG. 3).

Next, the operation of the power grid model system 200 with respect to the equipment update process in FIG. 4 is described. An equipment update could be, for example, the addition of a new substation, switch, transformer or junction, and its connectivity, to the power grid. An equipment update 212 is made to the power grid (402 in FIG. 4). The equipment update processor 206 is notified (404 in FIG. 4) which then updates the equipment layer in the power grid model (406 in FIG. 4). The equipment update processor 206 further notifies the topological processor 204 (408 in FIG. 4). The topological processor determines the extent of the equipment update and the minimum part of the power grid that needs to be re-traced (410 in FIG. 4). For each starting point in the power grid, the topological processor 204 parses through the details of the equipment layer in the historic power grid model 208. Upon completion of the trace, the topological processor 204 updates the topology layer in the historic power grid model 208 (412 in FIG. 4).

The operation of the power grid model system 200 with respect to the querying process in FIG. 5 is described. Users of the power grid model system 200 may query both the fast, high-level topology layer and the detailed, low-level equipment layer. The querying of the topology layer and/or equipment layer may be done at any point in time to give a complete picture of the power grid at that point in time. Topology layer querying 214 (502 in FIG. 5) could include, for example, establishing an overview of the substations connected downwards from a measured point. Equipment layer querying 216 (504 in FIG. 5) could include, for example, viewing precisely if a measurement device is connected above or below or switch. Each of the topology layer and equipment layer may be queried in combination or in turn as appropriate.

FIG. 6 illustrates a hypothetical application of the power grid model system 200. Shown in FIG. 6 are three snapshots of a hypothetical power grid as stored in the Historic Power Grid Model 208. Each snapshot represents a change in the grid state, and is stored at different points in time at both the low level equipment layer and the derived, high level topology layer. The first snapshot ("Initial Model") at time T-2 consists of a single connected topological island (shown outlined in solid line) being supplied from a large substation 610 through a single closed switch 602. Switches 606 in substation 612 and 608 in substation 614 are closed so that substations 612 and 614 are connected. Switch 604 in large substation 610 is open.

The second snapshot at time T-1 ("Switching Operations") has been updated due to three synchronous switching operations. That is, switch 604 in substation 610 has been closed and switches 606 in substation 612 and 608 in substation 614 have been opened. The switching operations are stored as attributes (i.e., whether open or closed) on the individual switches at the equipment layer level. Topologically, the switching operations now result in two separately connected topological islands (shown outlined in solid and dashed lines), fed by two different switches 602, 604 of the large substation 610. Two additional snapshots may also be created in the historic power grid model to describe the transient network configurations between time T-2 and time T-1 immediately after switches 604 and 606 had changed state, but prior to switch 608 opening. FIG. 6 does not show these intermediate snapshots.

The third snapshot at time T ("Equipment Update") represents the addition of new equipment, in this case substation 616. New substation 616 is connected by closed switch 618 and junction 620 to large substation 610 and substation 612. The new substation and its internals are now stored on the equipment layer, while it is topologically connected to one of the existing islands (shown outlined in solid line).

Figure 9:
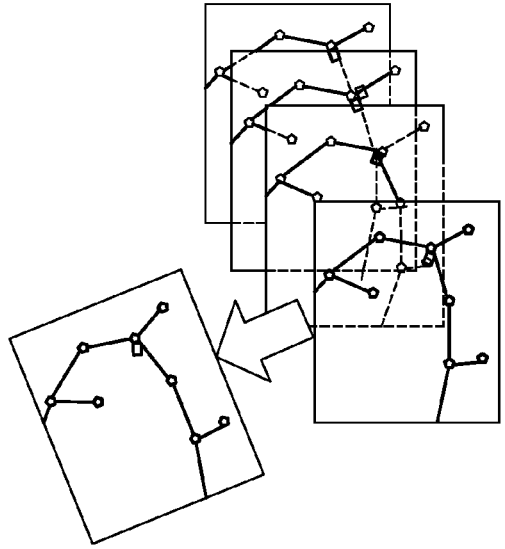
FIG. 9 illustrates another advantage of an exemplary embodiment of the power grid model.

Storing the complete power grid model historically provides a precise and important context to all event occurrences of the utility. It enables improved capabilities for monitoring, assessing and analyzing the power grid, for example:

Investigation of power outages, by providing a detailed and precise grid model before and after the power outage. As shown in FIG. 9, for example, a power grid at any point past in time may be examined for investigation of the power outage.

Figure 8:
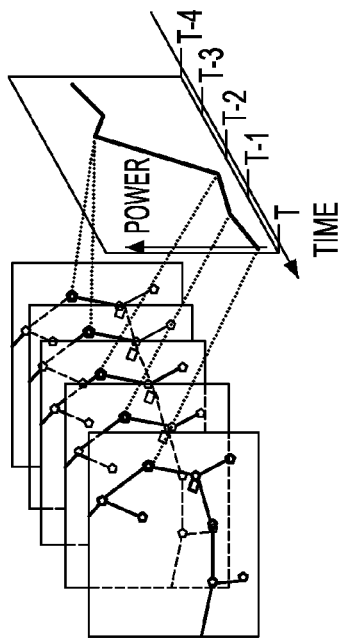
FIG. 8 illustrates an advantage of an exemplary embodiment of the power grid model.

Correlation of measured events and grid events. A switching operation most often results in some change in power flow behavior. As shown in FIG. 8, for example, the flow of power over time may be investigated and correlated with the state of the power grid at any point past in time.

Filtering out measurements taken in abnormal situations for planning purposes.

Further, by storing the power grid model in a dual-layer manner, each layer provides distinct and essential advantages such as:

The low-level equipment layer provides very granular precision and supports answering questions such as "what are the electrical characteristics of this transformer" or "how many customers are being supplied through this point".

The derived high-level topology layer facilitates rapid querying and enables hierarchical grid browsing. This is important for supporting large user volumes, fast graphical navigation and logical browsing.

Figure 7:
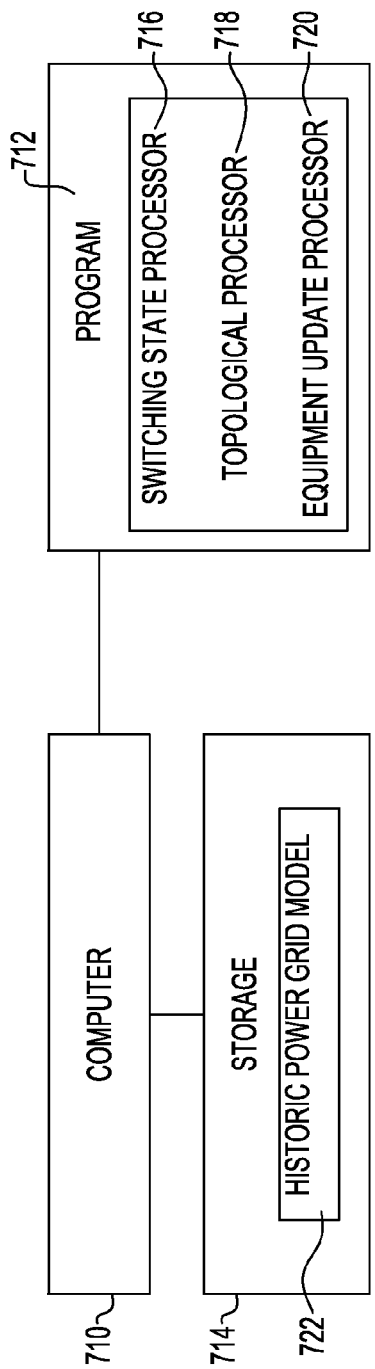
FIG. 7 is a block diagram that illustrates one exemplary hardware environment of the present invention.

The program environment in which a present embodiment of the invention is executed illustratively incorporates a general-purpose computer or a special purpose device such as a hand-held computer. FIG. 7 is a block diagram that illustrates one exemplary hardware environment of the present invention. The present invention is typically implemented using a computer 710 comprised of microprocessor means, random access memory (RAM), read-only memory (ROM) and other components. The computer may be a personal computer, mainframe computer or other computing device. Resident in the computer 710, or peripheral to it, will be a storage device 714 of some type such as a hard disk drive, floppy disk drive, CD-ROM drive, tape drive or other storage device.

Generally speaking, the software implementation of the present invention, program 712 in FIG. 7, is tangibly embodied in a computer-readable medium such as one of the storage devices 714 mentioned above. The program 712 comprises instructions which, when read and executed by the microprocessor of the computer 710 causes the computer 710 to perform the steps necessary to execute the steps or elements of the present invention. The program 712 in one exemplary embodiment may include the switching state processor 716, the topological processor 718 and the equipment update processor 720. The switching state processor 716, the topological processor 718 and the equipment update processor 720 may also be implemented by separate computer processors. The storage 714 in one exemplary embodiment may include the power grid model 722.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A power grid model system comprising:
   a switching state processor;
   a topological processor;
   an equipment update processor; and
   a power grid model for a power grid, the power grid model having an equipment layer and a topology layer wherein the equipment layer comprises a base equipment layer of the power grid overlaid with switch state data and the topology layer comprises a logical connectivity of the power grid which refers to how data is actually transferred in the power grid and is distinct from the equipment layer;
   wherein responsive to a switch operated in a power grid,
   the switching state processor is notified of the operated switch, notifies the topological processor of the operated switch and notifies the power grid model for updating of the power grid model; and
   the topological processor determines the extent of the update of the power grid model, parses through details of the equipment layer and updates the topology layer in the power grid model;
   wherein responsive to an equipment update to the power grid,
   the equipment update processor is notified of the equipment updates, updates the equipment layer in the power grid model and notifies the topological processor of the equipment update; and
   the topological processor determines the extent of the update in the power grid model, parses through details of the equipment layer and updates the topology layer in the power grid model,
   the power grid model providing an historical storage of each update to the equipment layer and the topology layer at any point in time such that the state of the equipment layer and the topology layer may be determined before or after the any point in time.

2. The system of claim 1 wherein the power grid model comprises a historical storage of the connectivity state and operational state of the power grid at any point in time.

3. The system of claim 1 wherein the power grid model comprises a querying function for querying the topology layer and a querying function for querying the equipment layer.

4. The system of claim 3 wherein the querying function for querying the topology layer includes querying the connectivity state and operational state of the topology layer at a previous point in time.

5. The system of claim 3 wherein the querying function for querying the equipment layer includes querying the connectivity state and operational state of the equipment layer at a previous point in time.

6. A method of managing a power grid model system comprising:
   providing a switching state processor, a topological processor, an equipment update processor, and a power grid model for a power grid, the power grid model having an equipment layer and a topology layer wherein the equipment layer comprises a base equipment layer of the power grid overlaid with switch state data and the topology layer comprises a logical connectivity of the power grid which refers to how data is actually transferred in the power grid and is distinct from the equipment layer;
   responsive to a switch operated in a power grid,
   notifying the switching state processor of the operated switch;
   notifying the topological processor of the operated switch;
   updating the operated switch in the power grid model; and
   determining by the topological processor the extent of the update of the power grid model, parsing by the topological processor through the details of the equipment layer and updating by the topological processor the topology layer in the power grid model;
   responsive to an equipment update to the power grid,
   notifying the equipment update processor, updating the equipment layer in the power grid model and notifying the topological processor of the equipment update;

determining by the topological processor the extent of the update of the power grid model, parsing by the topological processor through the details of the equipment layer and updating by the topological processor the topology layer in the power grid model; and historically storing and maintaining by the power grid model an historical record of each update to the equipment layer and topology layer at any point in time such that the state of the equipment layer and the topology layer may be determined before or after the any point in time.

7. The method of claim 6 wherein historically storing and maintaining includes historically storing and maintaining by the power grid model the connectivity state and operational state of the power grid.

8. The method of claim 6 wherein responsive to a querying request, further comprising querying the topology layer and querying the equipment layer.

9. The method of claim 8 wherein querying the topology layer includes querying the connectivity state and operational state of the topology layer at a previous point in time.

10. The method of claim 8 wherein querying the equipment layer includes querying the connectivity state and operational state of the equipment layer at a previous point in time.

11. A power grid model management service method comprising:

maintaining a switching state processor, a topological processor, an equipment update processor, and a power grid model for a power grid and having an equipment layer and a topology layer wherein the equipment layer comprises a base equipment layer of the power grid overlaid with switch state data and the topology layer comprises a logical connectivity of the power grid which refers to how data is actually transferred in the power grid and is distinct from the equipment layer;

responsive to receiving from a client switch operation data pertaining to a power grid, notifying the switching state processor of the operated switch;

notifying the topological processor of the operated switch;

updating the operated switch in the power grid model; and determining by the topological processor the extent of the update of the power grid model, parsing by the topological processor through the details of the equipment layer and updating by the topological processor the topology layer in the power grid model;

responsive to receiving from a client equipment update data pertaining to the power grid, notifying the equipment update processor, updating the equipment layer in the power grid model and notifying the topological processor database of the equipment update;

determining by the topological processor database the extent of the update in the power grid model, parsing by the topological processor through the details of the equipment layer and updating by the topological processor the topology layer in the power grid model; and historically storing and maintaining by the power grid model an historical record of each update to the equipment layer and topology layer at any point in time such that the state of the equipment layer and the topology layer may be determined before or after the any point in time.

12. The power grid model management service method of claim 11 further comprising providing to the client access to the power grid model.

13. The power grid model management service method of claim 11 wherein historically storing and maintaining includes historically storing and maintaining by the power grid model the connectivity state and operational state of the power grid.

14. The power grid model management service method of claim 11 wherein responsive to a querying request, further comprising querying the topology layer and querying the equipment layer.

15. The power grid model management service method of claim 14 wherein querying the topology layer includes querying the connectivity state and operational state of the topology layer at a previous point in time.

16. The power grid model management service method of claim 14 wherein querying the equipment layer includes querying the connectivity state and operational state of the equipment layer at a previous point in time.

17. A computer program product for managing a power grid model comprising:

a non-transitory computer readable storage medium having computer readable program code embodied therewith to provide a switching state processor, a topological processor, an equipment update processor, and a power grid model for a power grid, the power grid model having an equipment layer and a topology layer wherein the equipment layer comprises a base equipment layer of the power grid overlaid with switch state data and the topology layer comprises a logical connectivity of the power grid which refers to how data is actually transferred in the power grid and is distinct from the equipment layer, the computer readable program code comprising:

responsive to a switch operated in a power grid, computer readable program code configured to notify the switching state processor of the operated switch;

computer readable program code configured to notify the topological processor of the operated switch;

computer readable program code configured to update the operated switch in the power grid model; and computer readable program code configured to determine the extent of the update of the power grid model, to parse through the details of the equipment layer and to update the topology layer in the power grid model;

responsive to an equipment update to the power grid, computer readable program code configured to update the equipment update processor, to update the equipment layer in the power grid model and to notify the topological processor database of the equipment update;

computer readable program code configured to determine the extent of the update in the power grid model, to parse through the details of the equipment layer and to update by the topological processor the topology layer in the power grid model; and computer readable program code to historically store and maintain by the power grid model an historical record of each update to the equipment layer and topology layer at any point in time such that the state of the equipment layer and the topology layer may be determined before or after the any point in time.

18. The computer program product of claim 17 wherein computer readable program code to historically store and maintain includes computer readable program code configured to historically store and maintain by the power grid model the connectivity state and operational state of the power grid.

19. The computer program product of claim 17 wherein responsive to a querying request, further comprising computer readable program code configured to query the topology layer and to query the equipment layer.

20. The system of claim 1 further comprising the power grid model storing snapshots of the power grid at both the equipment layer and topology layer at any point in time.

21. The method of claim 6 further comprising historically storing and maintaining by the power grid model snapshots of the power grid at both the equipment layer and topology layer at any point in time.

22. The power grid model management service method of claim 11 further comprising historically storing and maintaining by the power grid model snapshots of the power grid at both the equipment layer and topology layer at any point in time.

23. The computer program product of claim 17 further comprising computer readable program code to historically store and maintain by the power grid model snapshots of the power grid at both the equipment layer and topology layer at any point in time.

\* \* \* \* \*